United States Patent [19]
Barkdoll et al.

[11] 3,944,347
[45] Mar. 16, 1976

[54] CONTACT LENS HAVING A HARD CENTER AND SOFT, TOUGH PERIPHERY

[75] Inventors: Archie E. Barkdoll, Hockessin; David C. England, Wilmington, both of Del.

[73] Assignee: E. I. Du Pont de Nemours & Co., Wilmington, Del.

[22] Filed: Feb. 26, 1974

[21] Appl. No.: 445,915

Related U.S. Application Data

[63] Continuation-in-part of Ser. No. 152,075, June 11, 1971, abandoned.

[52] U.S. Cl.............................. 351/160; 260/87.5 A
[51] Int. Cl.². ............................................. G02C 7/04
[58] Field of Search ...................................... 351/160

[56] References Cited
UNITED STATES PATENTS

| | | | |
|---|---|---|---|
| 3,132,123 | 5/1964 | Harris et al. ........................ | 260/87.5 |
| 3,308,107 | 3/1967 | Selman et al. ...................... | 260/87.5 |
| 3,484,503 | 12/1969 | Magner et al........................ | 260/900 |
| 3,542,461 | 11/1970 | Girard et al. ....................... | 351/160 |
| 3,808,179 | 4/1974 | Gaylord............................ | 260/86.1 E |

FOREIGN PATENTS OR APPLICATIONS

| | | | |
|---|---|---|---|
| 1,045,065 | 10/1966 | United Kingdom................. | 351/160 |

*Primary Examiner*—David H. Rubin
*Attorney, Agent, or Firm*—Anthony P. Mentis

[57] ABSTRACT

Disclosed is a segmented contact lens for the human eye constructed from fluorine-containing polymers, said lens having an index of refraction approximating that of tears and being characterized by a hard center segment surrounded by a soft tough periphery, the hard center having a Knoop hardness of at least 2 and the soft, tough periphery having a Clash-Berg torsion modulus of 95–1,000 lb/sq. in.

33 Claims, 2 Drawing Figures

CONTACT LENS HAVING A HARD CENTER AND SOFT, TOUGH PERIPHERY

RELATED APPLICATION

This application is a continuation-in-part of our copending application Ser. No. 152,075 filed June 11, 1971, now abandoned.

BACKGROUND OF THE INVENTION

1. Field of the Invention

This invention relates to transparent composite hard-soft contact lenses for correcting vision deficiencies of the human eye.

2. Description of the Prior Art

Contact lenses are of two general types, scleral and corneal. Lenses of the scleral type cover a substantial area of the eye during use and seal off circulation of tears and the atmosphere. This causes partial asphyxiation which affects the metabolism and vision of the eye. The more recently developed corneal lenses, because of their relatively smaller size and lighter weight, causes less irritation to the cornea and have achieved greater acceptance. However, the "break in" period necessary to accustom the cornea of the wearer to a corneal lens usually extends over a considerable period of time. Some persons have found contact lenses to be intolerable because of the eye irritation resulting during and after any extended period of continuous wear.

Contact lenses of both the corneal and scleral types have been commonly constructed of poly(methyl methacrylate) (PMMA). A lens made of such material is hard and stiff and when introduced for the first time into the eye of a person, the sensation is that of a foreign body. A fraction of the people who try PMMA lenses become adapted after a break-in period and can successfully wear the lenses. However, a larger fraction of the individuals who attempt to wear PMMA lenses never become wearers since they cannot adapt to such hard and stiff lenses because of discomfort, irritation, excessive tearing, and the like. Even those individuals who do adapt successfully to PMMA lenses, however, suffer an awareness of the lens in the eye.

Contact lenses have also been made from fluorinated copolymers, as for example, those disclosed in U.S. Pat. No. 3,542,461 issued to Girard et al. These lens are also hard and stiff and suffer from the same disadvantages as the PMMA lenses.

Contact lenses have also been made from other materials such as hydrogels and silicones. These are exemplified by U.S. Pat. Wo. 3,220,960 to Wichterle et al and U.S. Pat. No. 3,228,741 to Becker, respectively. Lenses made of these materials are referred to as soft lenses and are an improvement over hard and stiff lenses in being very comfortable, a property which is immediately apparent to the wearer. However, the hydrogel and silicone lenses have serious drawbacks which include poor or variable visual acuity resulting from difficulties in their manufacture and, in the case of the hydrogel lens, variable water absorption, tendency to absorb foreign substances, including tobacco smoke, bacteria, fluorescein, wetting solutions, mascara, and the necessity for daily sterilization. Hydrogel lens, after a period of prolonged use, may acquire proteinaceous deposits which can lead to physical discomfort and lessened visual acuity. In addition, the hydrogel and silicone lenses are weak and subject to damage by tearing and breaking. A discussion of the disadvantages of such lenses is found in "Precision-Cosmet Digest," Vol. 5, No. 9, Apr. 1965.

SUMMARY OF THE INVENTION

The present invention comprises a wettable, transparent, segmented contact lens for the eye consisting of fluorine-containing polymers and having a concavo-convex structure with the concave surface conforming substantially to the shape of the eye surface, a central segment defining an optical zone composed of a hard and stiff fluoropolymer of a Knoop hardness of at least 2.0 and a peripheral segment composed of a soft, tough fluoropolymer having a Clash-Berg torsion modulus in the range of about 95 to about 1,000 lb/sq. in. Both segments have a refractive index in the range 1.30 to 1.40, with a preferred refractive index of 1.336, which approximates that of tears.

Preferred fluoropolymers for the peripheral segment are those having a Shore Durometer (A) hardness of 90 or less, a tensile strength (break) of at least about 100 lb/sq. in., an elongation (break) of at least about 160% and a tear strength of at least about 5 lb/linear inch.

An important factor contributing to the comfort of the segmented lenses is the good permeability to oxygen of the fluorine-containing polymers, compared to the very low permeability of PMMA. This permeability is a factor in reducing or preventing corneal edema.

The softness of the peripheral segment insures excellent comfort to the wearer. In fact, comfort is equal to or greater than that observed with hydrogel and silicone lenses. At the same time the peripheral segment is tough and strong enough to resist damage by tearing, breakage, abrasion or irreversible elastic deformation. Furthermore, the inert nature of the fluorine-containing polymer insures that the lenses will not absorb bacteria, lens-wetting and sterilizing solutions, fluorescein, tobacco smoke, mascara and other deleterious materials.

The stiff and hard central segment makes it possible to realize and even improve upon the optical quality attainable with hard PMMA lenses. Thus, the desired anterior (refracting) and posterior (fitting) curves are readily obtained for the optic zone by use of molding techniques presently employed in the manufacture of PMMA lenses. Furthermore, these curves will remain unchanged on the eye by virtue of the rigid nature of the hard fluoropolymer thus assuring retention of good optics even with patients whose corneas are substantially out of round. Lenses constructed of hard fluoropolymers impart greater clarity of vision than comparable PMMA lenses, by virtue of reducing flare.

While the hard and stiff central segment generally performs the refracting function of the lens, no loss in visual acuity occurs when the peripheral segment enters the optical field of the eye since the refractive index of both segments is essentially the same. This also permits construction of a large peripheral segment which generally results in greater comfort to the wearer.

Because of the low refractive index of the lenses of this invention, they may be modified to obtain benefits not possible with lenses of higher refractive indices. For example, the posterior lens surface can be spherical or aspherical over part or all of the surface; or it may have one or more peripheral curves to improve fit and comfort; or it may be textured, patterned or channeled to improve the flow of oxygen and tears to the eye, all without adversely affecting visual acuity.

DETAILS OF THE INVENTION

Soft, tough fluorine-containing polymers suitable for use as the peripheral segment include those listed below. Table I gives their various properties and also shows some prior art materials (items 10–15) for comparison.

| Polymer | Abbreviation | U.S. Patent Reference |
|---|---|---|
| Tetrafluoroethylene/perfluoro (methyl vinyl ether) | (TFE/P₁MVE) | 3,132,123 |
| Tetrafluoroethylene/perfluoro (methyl vinyl ether) plasticized with polyperfluoropropylene oxide oil | | 3,484,503 |
| Tetrafluoroethylene/perfluoro (methyl vinyl ether)/vinylidene fluoride | TFE/P₁MVE/VF₂ | 3,235,537 |
| Tetrafluoroethylene/perfluoro [2(2-fluorosulfonylethoxy)propyl vinyl ether] | TFE/PSEPVE | 3,282,875 |
| Vinylidene fluoride/hexafluoropropylene/tetrafluoroethylene | VF₂/HFP/TFE | 2,968,649 |
| Vinylidene fluoride/hexafluoropropylene | VF₂/HFP | 3,051,677 |

Hard and stiff fluorine-containing polymers suitable for use as the hard central segment are known and include those listed below. Table II gives their various properties.

| Polymer | Abbreviation |
|---|---|
| 1. Polyperfluoro-2-methylene-4-methyl-1,3-dioxolane | PMD |
| 2. Poly(perfluoroalkylethyl methacrylates) of the monomeric formula $$CH_2=\overset{CH_3}{\underset{\|}{C}}-OCOCH_2CH_2(CF_2CF_2)_nCF_2CF_3$$ where n=1, 2, 3, 4 and 5, and preferably is predominantly 2 and 3. | PAEMA |
| 3. Perfluoro-2-methylene-4-methyl-1,3-dioxolane/tetrafluoroethylene | PMD/TFE |
| 4. Perfluoro-2-methylene-4-methyl-1,3-dioxolane/vinylidene fluoride | PMD/VF₂ |
| 5. Hexafluoroacetone/tetrafluoroethylene/ethylene | HFA/TFE/E |
| 6. Tetrafluoroethylene/perfluoro[2(2-fluorosulfonylethoxy)propyl vinyl ether] wherein all the —SO₂F groups have been converted to —SO₃H groups | TFE/PSEPVE, SO₃H form |
| 7. Tetrafluoroethylene/perfluoro[2(2-fluorosulfonylethoxy propyl vinyl ether] wherein all the —SO₂F groups have been converted to | TFE/PSEPVE, SO₃K form |

TABLE I

| No. | Polymer | Polymer Composition (mol ratio) | Hardness Shore Durometer[1] (A) | (D) | Clash-Berg[2] Torsion, psi | Tensile[3] Strength (break) psi | Elongation (break)[3] % | Tear[4] Strength lbs./linear in. | $n_D^{25[5]}$ |
|---|---|---|---|---|---|---|---|---|---|
| 1 | TFE/P₁MVE | 64:36 | 67 | — | 127 | 500–885 | 160–200 | 15.1–17.6 | 1.3276 |
| 2 | TFE/P₁MVE | 64:36 | 56, 57 | — | 132 | — | — | — | 1.3270 |
| 3 | TFE/P₁MVE | 70:30 (wt.ratio) | 64, 65 | — | 285 | 1800–1850 | 210–220 | 25.7 | 1.3300 |
| 4 | TFE/PSEPVE | 6.5:1 | 90 | — | 728 | 1900 | 280 | 76.3 | 1.3389 |
| 5 | TFE/PSEPVE | 8.3:1 | 80, 81 | — | 873 | 2800–2900 | 300 | 78.4 | 1.3400 |
| 6 | TFE/P₁MVE/VF₂ | 12:17:71 | 47–49 | — | <95 | 450 | 560 | 43 | 1.3700 |
| 7 | VF₂/HFP | 78:22 | 35, 36 | — | <109 | 160–165 | >1000 | 19.6–21.3 | 1.3713 |
| 8 | VF₂/HFP/TFE | 61:17.3:21.7 | 43 | — | 102 | 170–200 | 900–>1000 | 24.5–26.0 | 1.3617 |
| 9 | TFE/P₁MVE-poly(perfluoropropylene oxide) oil | No. 2 containing 10 wt. % oil | 65 | — | — | — | — | — | 1.3240 |
| 10 | Silicone Rubber ("Sylgard" 184) Becker U.S. 3,228,741 | | 56(80) | — | <144 | 410–850 | 80 | 0.69 | 1.430[7] |
| 11 | Hydrogel Wichterle, Ex. 8 Br. 1,035,877 | | 30–35 | — | <101 | 38–71 | 20 | Too low to measure | 1.4275 |
| 12 | Polyperfluoroalkylethyl methacrylate Girard, Ex. 2 U.S. 3,542,461 | | 92–96 | 48 | 10,289 | 600 | 10 | — | 1.370 |
| 13 | Polyperfluoroalkylethyl methacrylate Girard, Ex. 3 U.S. 3,542,461 | | 93–96 | 50 | — | — | — | — | 1.368 |
| 14 | Fluorinated Copolymer of ethylene with propylene (Teflon FEP-110 DeCarle, Br. 1,045,665 | | | 60–65[6] | 24,037 | 2700–3100[6] | 250–330[6] | 110–143 | 1.338[6] (Hazy) |
| 15 | Polychlorotrifluoroethylene (Kel-F) Stroop, U.S. 3,475,521 | | | R75–R95[6] | 38,981 | 4500–6000[6] | 80–250[6] | 90–96 | 1.425[6] |

NOTES:

[1] Conventional hardness measurements employing Type A and D Shore Durometer in accordance with ASTM D2240-68. Some of the reported values represent an average of more than one measurement.

[2] Conventional measurement of the stiffness of a plastic by means of a torsion test, in accordance with ASTM-D1043-72 using a Tinius Olsen Torsion Stiffness Tester modified to the extent that the manually operated brake was replaced by an electromagnetic clutch with a time delay switch mounted on the deflection head. The values were obtained at 74°C.

[3] ASTM-D412-68. Standard Method of Tension Testing of Vulcanized Rubber.

[4] Conventional measurements of tear resistance, as set forth in ASTM-D470-71 (p. 251).

[5] Refractive Index, measured by standard techniques on an Abbe Refractometer.

[6] Data from 1973–1974 Modern Plastics Encyclopedia.

[7] Data from Dow Corning Bulletin 67-005, "Information About Electrical/Electronic Materials", April 1970.

-continued

| | Polymer | Abbreviation |
|---|---|---|
| | —SO$_3$K groups | |
| 8. | Tetrafluoroethylene/perfluoro[2(2-fluorosulfonyl-ethoxy propyl vinyl ether] wherein all the —SO$_2$F groups have been converted to —SO$_3$NH$_4$ groups | TFE/PSEPVE, SO$_3$NH$_4$ form |
| 9. | Tetrafluoroethylene/perfluoro-2-methylene-4-methyl-1,3-dioxolane/perfluoro-(propyl vinyl ether) | TFE/PMD/P$_f$PVE |
| 10. | Copolymers of perfluoroalkylethyl methacrylates of the formula $$CH_2=C \begin{matrix} CH_3 \\ | \\ OCOCH_2CH_2(CF_2CF_2)_nCF_2CF_3 \end{matrix} \quad (A)$$

with one or more vinyl compounds, such as methyl methacrylate, wherein (A) is a mixture in which n=1, 2, 3, 4 and 5 and wherein the content of vinyl compound is no more than 20% by weight. | |

TABLE II

| No. | Polymer | Composition | $n_D^{25(1)}$ | Knoop$^{(2)}$ Hardness |
|---|---|---|---|---|
| 1 | PMD | Hompolymer | 1.333 | 21.5 |
| 2 | PAEMA | n = 1, 2, 3, 4 and 5 | 1.370 | 2.03 |
| 3 | PMD/TFE | 75:25 mol ratio | 1.335 | 19 |
| 4 | PMD/VF$_2$ | 75:25 mol ratio | 1.333 | — |
| 5 | HFA/TFE/E | | 1.392 | 8.6 |
| 6 | TFE/PSEPVE, SO$_3$H Form$^{(3)}$ | | 1.360 | 3.25 |
| 7 | TFE/PSEPVE, SO$_3$K Form$^{(3)}$ | | 1.360 | 7.92 |
| 8 | TFE/PSEPVE, SO$_3$NH$_4$ Form$^{(3)}$ | | 1.360 | 6.17 |
| 9 | TFE/PMD/P$_f$PVE | 85:8.8:6.2 by wt. | 1.345 | 4.8 |

Notes:
[1] Refractive index, measured by standard techniques on an Abbe Refractometer.
[2] The values were determined according to ASTM D1474-68 on a Tukon Micro-Hardness Tester, Model MO, employing a 25 gram load.
[3] PSEPVE, SO$_3$H form, PSEPVE, SO$_3$K form, PSEPVE, SO$_3$NH$_4$ form: indicates all the —SO$_2$F groups of PSEPVE were converted to SO$_3$H, —SO$_3$K, or —SO$_3$NH$_4$ groups, respectively.

Lens Permeability

Permeability of the novel lenses to $O_2$ and $CO_2$ has been found to be a valuable property. Good permeability is desirable in that oxygen can permeate through the lens to nourish the eye and metabolic waste (carbon dioxide) can permeate through the lens and away from the eye. Lens permeability is an important asset even though patterns can be employed to aid tear flow, etc. Oxygen and carbon dioxide permeabilities of about 500 Centibarrers or more, at 1 PSIG, are desirable. Permeabilities somewhat below about 500 Centibarrers may, however, also prove beneficial. It should be understood that the further the permeability ranges below about 500 Centibarrers, the more impermeable the lenses and the less the beneficial effect.

The contact lenses of the invention are significantly more permeable to oxygen and carbon dioxide than various art polymers as represented by poly(methyl methacrylate), PMMA. The following comparisons show the increased oxygen permeabilities of some of the polymers used in the novel contact lenses as compared to the prior art material PMMA.

| | $O_2$ Permeability Centibarrers Pressure | | |
|---|---|---|---|
| Polymer | 1 Psig | 15 Psig | 100 Psig |
| PMMA | — | — | 13* |
| TFE/P$_f$MVE | 1,190 | 1,202 | — |
| TFE/P$_f$MVE plasticized with 10% poly(perfluoropropylene)oxide)oils | 2,740 | 1,150 | — |

*Permeability is nil at lower pressures.

Bifocal Lenses

The segmented lenses of this invention can be constructed in a variety of ways so as to provide for the refractive and physical requirements of different individuals. Among the several types of lenses are the single vision lenses having symmetrical spherical anterior and posterior curves. This type of lens meets the needs of the majority of contact lens patients. Other types of lenses falling within the scope of this invention include: toric lenses having nonspherical anterior and/or posterior curves; and bifocal lenses which are designed to provide near and far vision for individuals whose eyes have lost accomodative power.

Among the several types of bifocal lenses which may be constructed are (a) the peripheral near-segment bifocal lenses in which distant vision is provided by the curves on the central segment and near vision by the curves on the peripheral segment; (b) upper and lower segment bifocal lenses in which distant vision is provided by the curves on the upper segment and near vision by the curves on the lower segment. Other types of lenses considered to be within the scope of this invention are prism ballast lenses, truncated lenses and lenticular lenses.

Construction of Lenses

Figure 1:
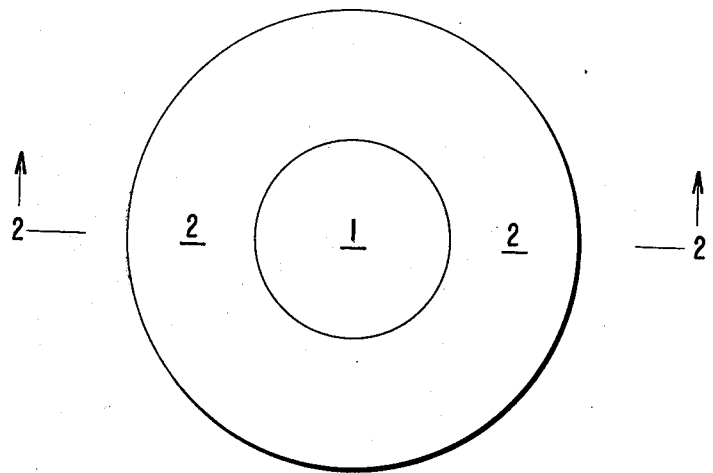
FIG. 1 shows a plan view of a lens of the invention in which the central segment is indicated by the numeral 1 and the peripheral segment by the numeral 2.
Figure 2:
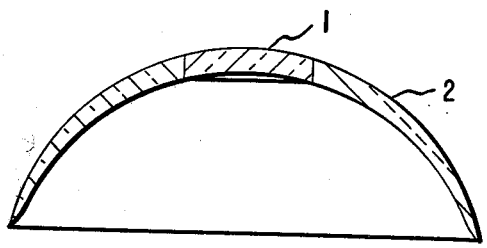
FIG. 2 is a sectional view taken on line 2—2 of FIG. 1.

Two general methods in use for manufacture of contact lenses constructed of poly (methyl methacrylate) or other hard material are as follows: (1) cutting of lenses from blanks on a radiusing lathe, followed by polishing and edging with a grinding or cutting device, and (2) compression molding of the plastic with precision molds of glass or steel, followed by edging by cutting or grinding.

The lenses of this invention, because of their segmented composite structure with a soft, tough, peripheral zone, are preferably fashioned by compression molding from specially constructed lens blanks, using precision molds constructed of suitable materials such as glass, stainless steel, carbon steel, carbides such as WC and TiC, brass, Ni- and Cr-plated steel or brass, and the like. By employing suitably constructed male and female mold forces, lenses can be molded which have anterior and posterior surfaces with the desired curvatures and degree of smoothness (polish) and which also have adequately tapered and rounded edges, so that the molding operation produces a finished lens, ready for wear. Or if desired, the mold forces can be constructed so as to produce a so-called semi-finished lens, one with proper anterior and posterior curves but which has not been edged. The lens is subsequently edged to provide a comfortable fit.

The lens blanks which have been found advantageous for the practice of this invention comprise a circular segmented sheet or film consisting of a central circular piece of hard fluoropolymer having approximately the diameter and thickness of the optic zone of the finished lens, said central circular piece being firmly bonded to an annular ring of soft fluoropolymer having a thickness approximating that of the central zone and an outer diameter slightly larger than that of the finished lens.

These blanks are generally constructed by inserting a central disk of hard fluoropolymer having the desired diameter and thickness into a hole of identical diameter in a sheet of soft, tough fluoropolymer of approximately the same thickness, subjecting the composite to pressure at an elevated temperature to bond the two segments together, without, however, causing appreciable flow of the polymers, and finally punching out the blank of desired diameter so that the central hard segment is centered in the peripheral annulus of soft polymer. Other means for providing lens blanks can also be used. For instance, hard and soft polymers can be co-extruded into a rod having a hard circular core and a soft, tough outer shell, and the rod then sliced into blanks.

Wettability is an essential requirement for corneal lenses to provide comfort and good visual acuity. Wettability is achieved by one of several methods known to the art depending on the composition of the hard and soft segments.

One generally applicable method involves subjecting the lenses to the action of a glow discharge at a low pressure of, say, 1 mm of mercury for a limited time of, say, 15 seconds. The lens is then wettable when placed in water. In a variation of this method, a vinyl monomer containing a hydrophilic group such as, for instance, acrylic acid, is applied to the lens, in either liquid or vapor form, after its exposure to the discharge but before exposure to air. This results in formation of a wettable hydrophilic film on the lens.

Another method for imparting wettability consists in etching the surface of the lens with sodium or other alkali metal as a solution in anhydrous $NH_3$ or as a complex with napthalene in solution or in suspension in tetrahydrofuran or other inert ethers, followed by exposure to water to destroy excess alkali metal. In some instances the treatment leaves a brown discoloration on the surface which is removed, frequently with enhancement of wetting, by exposure of the lens to warm commercial household bleach solution for several minutes.

A TFE/PSEPVE copolymer can be rendered wettable by converting hydrophobic surface sulfonyl fluoride ($—SO_2F$) groups to more hydrophilic groups. For example, wettability is imparted by brief immersion of lenses of this polymer in ethanolamine, diethanolamine, or aqueous 10% potassium hydroxide solution, by virtue of the formation of the groups $—SO_2NHCH_2CH_2OH$, $—SO_2N(CH_2CH_2OH)_2$ or $—SO_3K$, respectively, on the surface. The immersion is carried out at room temperature for about 5 minutes.

By carrying out the immersion at a higher temperature and for a longer time the $SO_2F$ groups throughout the entire polymer, including those on the surface, can be converted. For example a 10 mil film of copolymer immersed in 10% aqueous KOH at 90°C. for about 2 days will have all its $SO_2F$ groups converted to $SO_3K$ groups, as illustrated for instance by copolymer No. 6 in Table II. Refluxing with 50 wt. percent of aqueous alkali metal hydroxide and a solvent for about 4 hours will accomplish the same result; see for example U.S. Pat. No. 3,282,875.

Composite films were molded by placing pieces of various hard and soft fluoropolymers side-by-side and subjecting them to suitable temperature and pressure to form a composite film consisting of hard and soft sections joined at the juncture between the sections.

SPECIFIC EMBODIMENTS OF THE INVENTION

The following Examples illustrate but do not limit the invention.

EXAMPLE 1

Part A — Preparation of Hard/Soft Lens Blank

A disk of $PMD/VF_2$ (75/25 mol %) copolymer, 6.67 mm in diameter, comprising the hard segment, was punched from a piece of 0.25-mm film. The disk was fitted into a hole of 6.67 mm diameter in a piece of TFE/P,MVE (64/36 mol %) copolymer film with a thickness of 0.25 mm, comprising the soft segment. The composite was placed between two sheets of 0.05-mm Kapton polyimide film, and pressed at a temperature of 280°C and a force of 150 g for 2 minutes. This bonded the hard and soft segments together essentially without distorting the hard segment out of round. The protective polyimide film was stripped off, and a composite lens blank 11.7 mm in diameter was punched out in such a way that the hard $PMD/VF_2$ segment was precisely centered in the concentric annulus formed by the soft TFE/P,MVE segment.

Part B — Molding of Lenses

The lens blank was precisely centered in a female die at room temperature and the mold body and male die, both previously heated to 280°C, were lowered onto it. The conventional mold assembly was preheated at 280°C for 5 minutes, and the pressure then slowly increased to 100 lbs. The assembly was then cooled immediately to room temperature while the pressure was maintained. The mold was opened and the lens recovered. The lens was well-formed with the hard and soft segments firmly bonded to each other and the edge of the lens was feathered. It weighed 65.4 mg and had an overall diameter of 11.7 mm and a central thickness of 0.4 mm; diameter of optic zone, 6.0 mm; refractive power of the optic zone, +2.00 diopters.

The lens was made wettable with water by subjecting it to a corona discharge at a pressure of about 1 mm Hg. The wetted lens gave excellent vision when worn by a test subject in conjunction with an auxiliary ophthalmic lens, to adjust the refractive power of the contact lens to the refractive requirements of said subject.

EXAMPLE 2

Part A — Preparation of Hard/Soft Lens Blank

A disk of PMD/TFE (75/25 mol %) copolymer, 9.00 mm in diameter, 0.51 mm thick and weighing 64 mg, comprising the hard segment, was fitted in a 9.00-mm hole in a piece of TFE/P$_f$MVE (64/36 mol %) copolymer film 0.56–0.66 mm thick. The composite structure was placed between two pieces of 0.05-mm polyimide film and heated at 280°C for 3 minutes under a force of 370 g to bond the two segments. After stripping off the polyimide film, a segmented lens blank 14 mm in diameter was punched from the composite film so that the hard circular PMD/TFE segment was precisely centered in the concentric soft annulus of TFE/P$_f$MVE copolymer.

Part B — Molding of Lens

The lens blank was placed in a conventional lens mold assembly as in Example 1. The assembly was then heated at 280°C for 5 minutes, the pressure slowly increased to 100 lbs, and the assembly then cooled immediately to room temperature while maintaining the pressure. The mold was opened and the lens recovered. The hard and soft segments of the lens were firmly bonded and the lens was well-formed out to the peripheral bead of the lens, with flash extending beyond the bead. The optic quality of the central zone was excellent. The total weight of the molded lens was 190 mg. The lens was then edged. The finished lens, after edging, weighed 153 mg and had an overall diameter of 13.3 mm and a central thickness of 0.06 mm.

EXAMPLE 3

Part A — Preparation of Lens Blank

A 9-mm hole was punched in the center of a disk of TFE/P$_f$MVE (64/36 mol %) copolymer 0.69 mm thick and 13 mm in diameter. In the hole was placed a disk of PMD/TFE (75/25 mol %) copolymer, 9 mm in diameter and 0.76 mm (30 mils) thick. The resulting hard-/soft composite structure was placed between two polyimide films and pressed for 3 minutes at 280°C. and a force of 370 g to bond the two segments. The polyimide film was then stripped from the resulting lens blank.

Part B — Molding of Lens

The lens blank was placed in a mold as in Example 1 and molding was carried out by heating the mold assembly at 280°C for 5 minutes without pressure, then pressuring it to 100 lbs. and immediately cooling to room temperature while maintaining pressure. The mold was opened and the lens recovered. The lens was well-formed to the edge, with flash extending beyond the edge. There was good bonding between the hard and soft segments. The total weight was 187.7 mg. The lens was trimmed and edged as described under Example 2. The edged lens weighed 171.2 mg and had an overall diameter of 13.4 mm and a central thickness of 1.16 mm. The optical quality of the lens was excellent and objects viewed through the lens appeared as sharp images.

EXAMPLE 4

Part A — Preparation of Lens Blank

A 7.5-mm disk of PMD/TFE (75/25 mol %) copolymer film, 0.51 mm thick and weighing 50 mg, was fitted into a 7.5-mm hole in a piece of 0.41-mm film comprised of a TFE/P$_f$MVE (64/36 mol %) copolymer plasticized with 10% by weight of a poly(hexafluoropropylene oxide) oil. The composite structure was placed between two polyimide films and pressed for 2 minutes at 260°C and a force of 130 g to bond the two segments. An excellent bond was formed between the two segments. The polyimide film was stripped off and a lens blank 13 mm in diameter was punched from the composite so that the circular hard PMD/TFE central segment was exactly centered in the annulus of soft polymer. The blank weighed 125 mg.

Part B — Molding of Lens

The lens blank was placed in a conventional lens mold assembly as in Example 1. The mold assembly was maintained at 260°C without pressure for 5 minutes, after which it was pressured to 100 lbs. The temperature and pressure were then maintained for 30 seconds after which the assembly was cooled to room temperature under pressure. The resulting lens was well-formed out to the peripheral bead with flash extending beyond the bead. The hard and soft segments were strongly bonded. The lens had a central thickness of 0.47 mm and an overall weight of 121.8 mg. The optical characteristics of the lens were excellent.

EXAMPLE 5

Part A — Preparation of Lens Blank

A 7.5-mm disk of PMD/VF$_2$ (75/25 mol %) copolymer film, 0.43 mm thick, was placed in a 7.5-mm hole in a piece of 0.56-mm film comprised of a TFE/P$_f$MVE (64/36 mol %) copolymer plasticized with 10% by weight of a poly(hexafluoropropylene oxide) oil. The composite structure was placed between two polyimide films and pressed for 2 minutes at 260°C for a force of 130 g. The hard and soft segments of the resulting composite were well-bonded. The polyimide film was stripped off, and a lens blank 13 mm in diameter was punched out so that the hard PMD/VF$_2$ central segment was centered in the annulus of soft polymer. The blank weighed 145 mg.

Part B — Molding of Lens

The lens blank was placed in a conventional lens mold assembly as in Example 1. The mold assembly was maintained at 260°C without presure for 5 minutes, after which the pressure was increased to 100 lbs, and these conditions maintained for 30 seconds. The assembly was then rapidly cooled to room temperature under pressure. The mold was opened and the lens recovered. The lens was well-formed with flash extending beyond the peripheral head. The hard and soft segments were strongly bonded to each other. The lens had a central thickness of 0.51 mm and weighed 145.3 mg. The optical characteristics of the lens were excellent.

EXAMPLE 6

Part A — Preparation of Lens Blank

A 7.5-mm disk of PMD/VF$_2$ (75/25 mol %) copolymer film, 0.43 mm in diamater, was placed into a 7.5-mm hole in a piece of TFE/P$_f$MVE/VF$_2$ terpolymer film 0.48 mm in thickness. The composite was placed between two pieces of polyimide film and pressed for 2 minutes at 240°C and a force of 100 lbs. The hard and soft segments were well-bonded. The polyimide film was stripped off and a lens blank 14 mm in diameter was punched out so that the hard central segment was centered in the annulus of soft polymer. The blank weighted 95 mg.

Part B — Molding Of Lens

The lens blank was placed in a conventional lens mold assembly as in Example 1. The mold assembly was maintained at 240°C without pressure for 3 minutes, after which the pressure was increased to 100 lbs. The assembly was then rapidly cooled to room temperature while the pressure was maintained. The mold was opened and the lens recovered. The lens was well molded with the hard and soft segments completely bonded together. The lens had a central thickness of 0.31 mm and weighed 94.5 mg. The optics were excellent.

EXAMPLE 7

Part A — Preparation of Lens Blank

A 7.5-mm disk of PMD/VF$_2$ (75/25 mol %) copolymer film, 0.43 mm thick, was fitted into a 7.5-mm hole in a piece of VF$_2$/HFP/TFE terpolymer film 0.61 mm thick. The composite was placed between two pieces of polyimide film and pressed for 2 minutes at 240°C with a force of 25-50 lbs. Without removing the protective polyimide film, a lens blank 14 mm in diameter was punched out so that the hard PMD/VF$_2$ central segment was centered in the annulus of soft polymer. The polyimide film was then removed from the blank which weighted 120 mg.

Part B — Molding of Lens

The lens blank was placed in a conventional lens mold assembly as in Example 1. The mold assembly was maintained at 240°C without pressure for 3 minutes after which the pressure was increased to 100 lbs, and the assembly immediately cooled to room temperature with maintenance of pressure. The mold was opened and the lens recovered. The lens was well-molded to the peripheral bead, with flash extending beyond the bead. The hard and soft segments were wellbonded. The lens had a central thickness of 0.44 mm and weighed 104.7 mg. The optical quality was excellent.

EXAMPLE 8

Part A — Preparation of Lens Blank

A 7.5-mm disk of PMD/TFE (75/25 mol %) copolymer 0.51 mm thick and weighing 50 mg was fitted into a 7.5-mm hole in a piece of TFE/PSEPVE copolymer film 0.48 mm thick. After being sandwiched between two pieces of polyimide film, the composite was pressed for 2 minutes at 260°C with a force of 1220 g. A blank 12.5 mm in diameter and weighing 110 mg was then punched out from the composite so that the hard segment was centered within the annulus of soft polymer.

Part B — Molding of Lens

The lens blank was placed in a conventional lens mold assembly as in Example 1. The mold assembly was maintained at 280°C without pressure for 5 minutes, after which the pressure was increased to 100 lbs. The temperature and pressure were maintained for 1 minute, after which the assembly was rapidly cooled to room temperature with maintenance of pressure. The mold was opened and the lens recovered. The lens was well-formed with the hard and soft segments bonded together. The lens had a central thickness of 0.41 mm and weighed 106.3 mg. The optical quality was very good.

EXAMPLE 9

Part A — Preparation of Lens Blank

A 7.5-mm disk of PMD/VF$_2$ (75/25 mol %) copolymer film 0.43 mm thick was set in a 7.5-mm hole in a piece of TFE/PSEPVE copolymer film 0.42 mm thick. The composite structure was sandwiched between two pieces of polyimide film and pressed for 2 minutes at 260°C with a force of 1220 g. After stripping off the polyimide film, the lens blank, 13 mm in diameter and weighing 100 mg, was punched out so that the hard segment was centered in the annular soft segment.

Part B — Molding of Lens

The lens blank was placed in a conventional lens mold assembly as in Example 1. The mold assembly was maintained at 260°C for 5 minutes without pressure, after which the pressure was increased to 100 lbs. The pressure and temperature were maintained for 30 seconds, after which the assembly was rapidly cooled to room temperature with maintenance of pressure. The mold was opened and the lens recovered. The two segments of the lens were firmly bonded together. The lens had a central thickness of 0.36 mm and weighed 100.0 mg.

EXAMPLE 10

A segmented hard/soft composite film was prepared as follows: A piece of PMD/TFE (75/25 mol %) copolymer, comprising the hard segment, and a piece of VF$_2$/HFP copolymer comprising the soft segment, were placed side-by-side between two sheets of 0.5-mm polyimide film, and subjected to a temperature of 240°C and a pressure of 100 lbs for 1 minute. The resulting segmented structure consisted of a soft, transparent film 0.18 mm thick firmly bonded to a transparent, hard film 0.13 mm thick by common edge.

EXAMPLE 11

A piece of PMD/VF$_2$ (75/25 mol %) copolymer, comprising the hard segment, and a piece of VF$_2$/HFP copolymer comprising the soft segment, were placed side-by-side between two pieces of 0.05 mm polyimide film and subjected to a temperature of 240°C and a pressure of 100 lbs for 1 minute. The resulting segmented film consisted of a soft, transparent section, 0.18 mm thick, joined by a common edge to a transparent, hard section 0.13 mm thick. The respective hard and soft sections of film were firmly attached to each other.

EXAMPLE 12

A piece of PMD/TFE (75/25 mol %) copolymer, comprising the hard segment, and piece of VF$_2$/HFP/TFE terpolymer comprising the soft segment, were sandwiched side-by-side between two pieces of 0.05 mm polyimide film and subjected to a temperature of 240°C and a pressure of 100 lbs for 1 minute. The resulting segmented film consisted of a soft, transparent section 0.18 mm thick joined by a common edge with the hard, transparent section 0.20 mm thick. The bond between the two sections was almost invisible and very strong.

EXAMPLE 13

A piece of TFE/P$_t$MVE/VF$_2$ terpolymer, comprising the soft segment, and a piece of PMD/TFE (75/25 mol %) copolymer, comprising the hard segment, were placed between two pieces of 0.05 mm polyimide film and subjected to a temperature of 0.05 mm polyimide film and subjected to a temperature of 240°C and a pressure of 100 lbs for 1 minute. The resulting segmented film consisted of a transparent, soft portion 0.18 mm thick bonded by a common edge to a transparent, hard section 0.20 mm thick.

EXAMPLE 14

A piece of TFE/P,MVE (64/36 mol %) copolymer comprising the soft segment, and a piece of a copolymer of 20 wt % methyl methacrylate and 80 wt % of a homogous mixture of perfluoroalkylethyl methacrylates where the perfluoroalkyl groups contain predominantly six and eight carbon atoms comprising the hard central segment, were sandwiched side by side between two pieces of 0.05 mm polyimide film and subjected to a temperature of 220°C and a pressure of 500 lbs for 1 minute. The resulting segmented film consisted of a soft, transparent section firmly bonded by a common edge with a hard, transparent section.

We claim:

1. A wettable, transparent segmented contact lens for the eye consisting of fluorine-containing polymers and having a concavo-convex structure with the concave surface conforming substantially to the shape of the eye surface, a central segment defining an optical zone composed of a hard, stiff fluoropolymer of a Knoop hardness of at least 2.0 and a peripheral segment composed of a soft, tough fluoropolymer having a Clash-Berg torsion modulus in the range of about 95 to about 1000 lb/sq.in., a Shore Durometer (A) hardness of 90 or less, a tensile strength (break) of at least about 100 psi, an elongation (break) of at least about 160% and a tear strength of at least about 5 lb/linear inch; each segment having a refractive index in the range 1.30 to 1.40;

the central segment being made from a fluoropolymer of the group consisting of polyperfluoro-2-methylene-4-methyl-1,3-dioxolane; poly(perfluoroalkylethyl methacrylate) of the monomeric formula

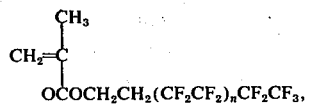

wherein $n = 1, 2, 3, 4$ and 5; copolymer of perfluoro-2-methylene-4-methyl-1,3-dioxolane and tetrafluoroethylene; copolymer of perfluoro-2-methylene-4-methyl-1,3-dioxolane and vinylidene fluoride; copolymer of hexafluoroacetone, tetrafluoroethylene and ethylene; copolymer of tetrafluoroethylene, perfluoro-2-methylene-4-methyl-1,3-dioxolane and perfluoro(propyl vinyl ether); copolymer of tetrafluoroethylene and perfluoro[2(2-fluorosulfonylethoxy)propyl vinyl ether] in which all the —SO$_2$F groups have been converted to —SO$_3$H groups; the same copolymer in which all the —SO$_2$F groups have been converted to —SO$_3$K groups; and the same copolymer in which all the —SO$_2$F groups have been converted to —SO$_3$NH$_4$ groups; and a copolymer of perfluoroalkylethyl methacrylates of the monomeric formula (A)

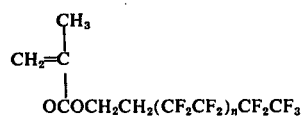

with one or more vinyl compounds wherein (A) is a mixture in which $n = 1, 2, 3, 4$, and 5 and wherein the content of vinyl compound is no more than 20% by weight; and the peripheral segment being made from a fluoropolymer of the group consisting of a copolymer of tetrafluoroethylene and perfluoro(methyl vinyl ether); the same copolymer plasticized with polyperfluoropropylene oxide oil; a copolymer of tetrafluoroethylene, perfluoro(methyl vinyl ether) and vinylidene fluoride; a copolymer of tetrafluoroethylene and perfluoro[2(2-fluorosulfonylethoxy)propyl vinyl ether]; a copolymer of vinylidene fluoride, hexafluoropropylene and tetrafluoroethylene; and a copolymer of vinylidene fluoride and hexafluoropropylene.

2. A lens of claim 1 in which the central section is polyperfluoro-2-methylene-4-methyl-1,3-dioxolane.

3. A lens of claim 1 in which the central segment is a poly(perfluoroalkylethyl methacrylate) of the monomeric formula

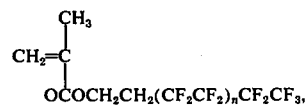

wherein $n = 1, 2, 3, 4$ and 5.

4. A lens of claim 1 in which the central segment is a copolymer of perfluoro-2-methylene-4-methyl-1,3-dioxolane and tetrafluoroethylene.

5. A lens of claim 1 in which the central segment is a copolymer of perfluoro-2-methylene-4-methyl-1,3-dioxolane and vinylidene fluoride.

6. A lens of claim 1 in which the central segment is a terpolymer of hexafluoroacetone, tetrafluoroethylene and ethylene.

7. A lens of claim 1 in which the central segment is a copolymer of tetrafluoroethylene and perfluoro[2(2-fluorosulfonylethoxy)propyl vinyl ether], SO$_3$H form.

8. A lens of claim 1 in which the central segment is a copolymer of tetrafluoroethylene and perfluoro[2,(2-fluorosulfonylethoxy)propyl vinyl ether], SO$_3$K form.

9. A lens of claim 1 in which the central segment and optical zone is a copolymer of tetrafluoroethylene and perfluoro[2(2-fluorosulfonylethoxy)propyl vinyl ether], SO$_3$NH$_4$ form.

10. A lens of claim 1 in which the central segment is a terpolymer of tetrafluoroethylene, perfluoro-2-methylene-4-methyl-1,3-dioxolane and perfluoropropyl vinyl ether.

11. A lens of claim 1 in which the central segment is a copolymer of perfluoroalkylethyl methacrylates of the formula (A)

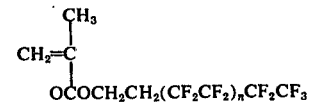

with one or more vinyl compounds wherein (A) is a mixture in which $n = 1, 2, 3, 4$ and 5 and wherein the content of vinyl compound is no more than 20% by weight.

12. A lens of claim 1 in which the peripheral segment is a copolymer of tetrafluoroethylene and perfluoro(methyl vinyl ether).

13. A lens of claim 12 in which the mol ratio of tetrafluoroethylene to perfluoro(methyl vinyl ether) is 64:36.

14. A lens of claim 1 in which the peripheral segment is a terpolymer of tetrafluoroethylene, perfluoro(methyl vinyl ether) and vinylidene fluoride.

15. A lens of claim 14 in which the mol ratio of tetrafluoroethylene to perfluoro(methyl vinyl ether) to vinylidene fluoride is 12:17:71.

16. A lens of claim 1 in which the peripheral segment is a copolymer of tetrafluoroethylene and perfluoro[2(2-fluorosulfonylethoxy)propyl vinyl ether].

17. A lens of claim 16 in which the mol ratio of tetrafluoroethylene to perfluoro[2(2-fluorosulfonylethoxy)propyl vinyl ether) ranges from 6.5:1 to 8.3:1.

18. A lens of claim 1 in which the peripheral segment is a terpolymer of tetrafluoroethylene, hexafluoropropylene and vinylidene fluoride.

19. A lens of claim 18 in which the mol ratio of tetrafluoroethylene to hexafluoropropylene to vinylidene fluoride is 21.7:17.3:61.

20. A lens of claim 1 in which the peripheral segment is a copolymer of vinylidene fluoride and hexafluoropropylene.

21. A lens of claim 20 in which the mol ratio of vinylidene fluoride to hexafluoropropylene is 78:22.

22. A lens of claim 1 in which the peripheral segment is a copolymer of tetrafluoroethylene and perfluoro(methyl vinyl ether) plasticized with poly(hexafluoropropylene oxide) oil.

23. A lens of claim 1 in which the central segment is a copolymer of vinylidene fluoride/perfluoro-2-methylene-4-methyl-1,3-dioxolane and the peripheral segment is a copolymer of tetrafluoroethylene/perfluoro(methyl vinyl ether).

24. A lens of claim 1 in which the central segment is a copolymer of tetrafluoroethylene/perfluoro-2-methylene-4-methyl-1,3-dioxolane and the peripheral segment is a copolymer of tetrafluoroethylene/perfluoro(methyl vinyl ether).

25. A lens of claim 1 in which the central segment is a copolymer of vinylidene fluoride/perfluoro-2-methylene-4-methyl-1,3-dioxolane and the peripheral vinyl ether)/vinylidene fluoride.

26. A lens of claim 1 in which the central segment is a copolymer of vinylidene fluoride/perfluoro-2-methylene-4-methyl-1,3-dioxolane and the peripheral segment is a terpolymer of vinylidene fluoride/hexafluoropropylene/tetrafluoroethylene.

27. A lens of claim 1 in which the central segment is a copolymer of tetrafluoroethylene/perfluoro-2-methylene-4-methyl-1,3-dioxolane and the peripheral segment is a copolymer of tetrafluoroethylene/perfluoro[2-(2-fluorosulfonylethoxy)propylvinyl ether].

28. A lens of claim 1 in which the central segment is a copolymer of vinylidene fluoride/perfluoro-2-methylene-4-methyl-1,3-dioxolane and the peripheral segment is a copolymer of tetrafluoroethylene/perfluoro[2(2-fluorosulfonylethoxy)propylvinyl ether].

29. A lens of claim 1 in which the central segment in a copolymer of tetrafluoroethylene/perfluoro-2-methylene-4-methyl-1,3-dioxolane and the peripheral segment is a copolymer of vinylidene fluoride/hexafluoropropylene.

30. A lens of claim 1 in which the central segment is a copolymer of vinylidenefluoride/perfluoro-2-methylene-4-methyl-1,3-dioxolane and the peripheral segment is a copolymer of vinylidene fluoride/hexafluoropropylene.

31. A lens of claim 1 in which the central segment is a copolymer of tetrafluoroethylene/perfluoro-2-methylene-4-methyl-1,3-dioxolane and the peripheral segment is a terpolymer of vinylidene fluoride/hexafluoropropylene/tetrafluoroethylene.

32. A lens of claim 1 in which the central segment is a copolymer of tetrafluoroethylene/perfluoro-2-methylene-4-methyl-1,3-dioxolane and the peripheral segment is a terpolymer of tetrafluoroethylene/perfluoro(methyl vinyl ether)vinylidene fluoride.

33. A lens of claim 1 in which the central segment is a copolymer of tetrafluoroethylene/perfluoro[2-(2-fluorosulfonylethoxy)propylvinyl ether] in which all the sulfonyl fluoro groups have been converted to —$SO_3H$ groups, and the peripheral segment is a copolymer of tetrafluoroethylene/perfluoro[2-(2-fluorosulfonylethoxy)propylvinyl ether].

* * * * *